Sept. 3, 1935.  J. M. C. SEMERY  2,013,586
DEVICE FOR CHANGING GEAR
Filed July 3, 1934  3 Sheets-Sheet 1
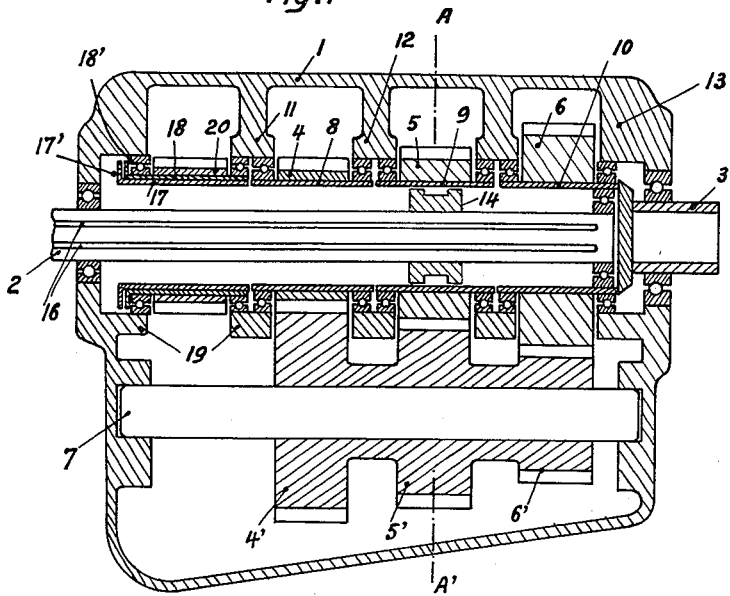
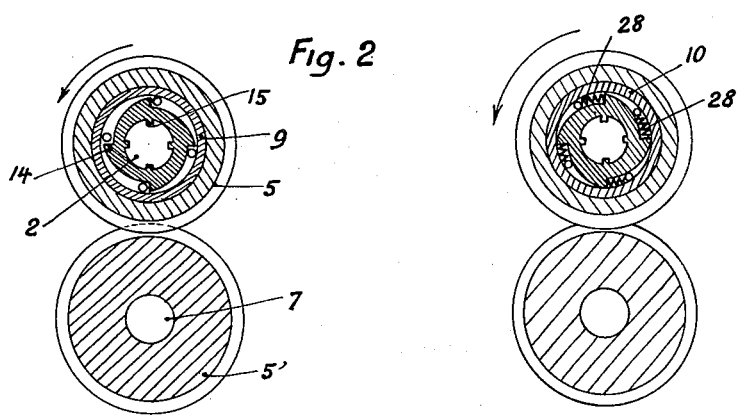
J. M. C. Semery
INVENTOR
By Marks & Clerk
Attys.

Sept. 3, 1935.  J. M. C. SEMERY  2,013,586
DEVICE FOR CHANGING GEAR
Filed July 3, 1934  3 Sheets-Sheet 2
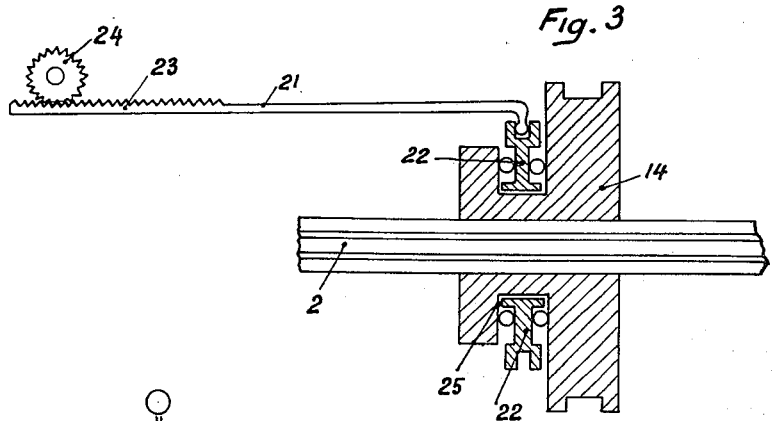
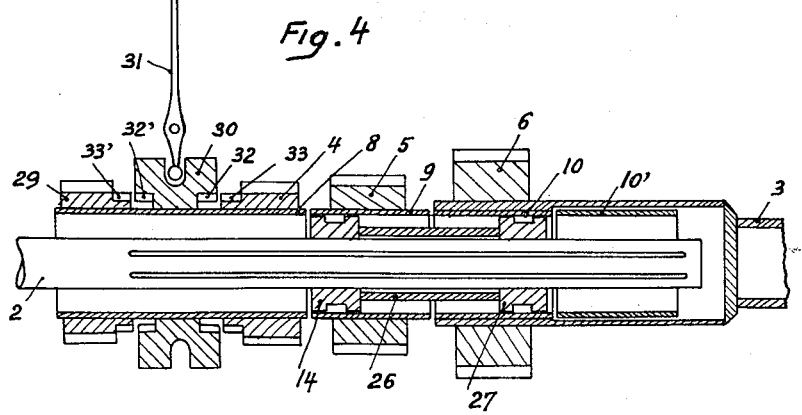
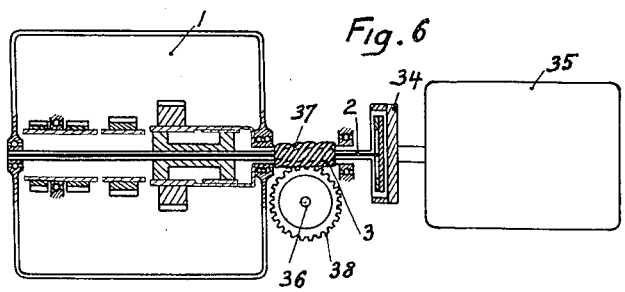
J. M. C. Semery
INVENTOR
By Marks & Clerk
ATTYS.

Sept. 3, 1935.  J. M. C. SEMERY  2,013,586
DEVICE FOR CHANGING GEAR
Filed July 3, 1934   3 Sheets-Sheet 3
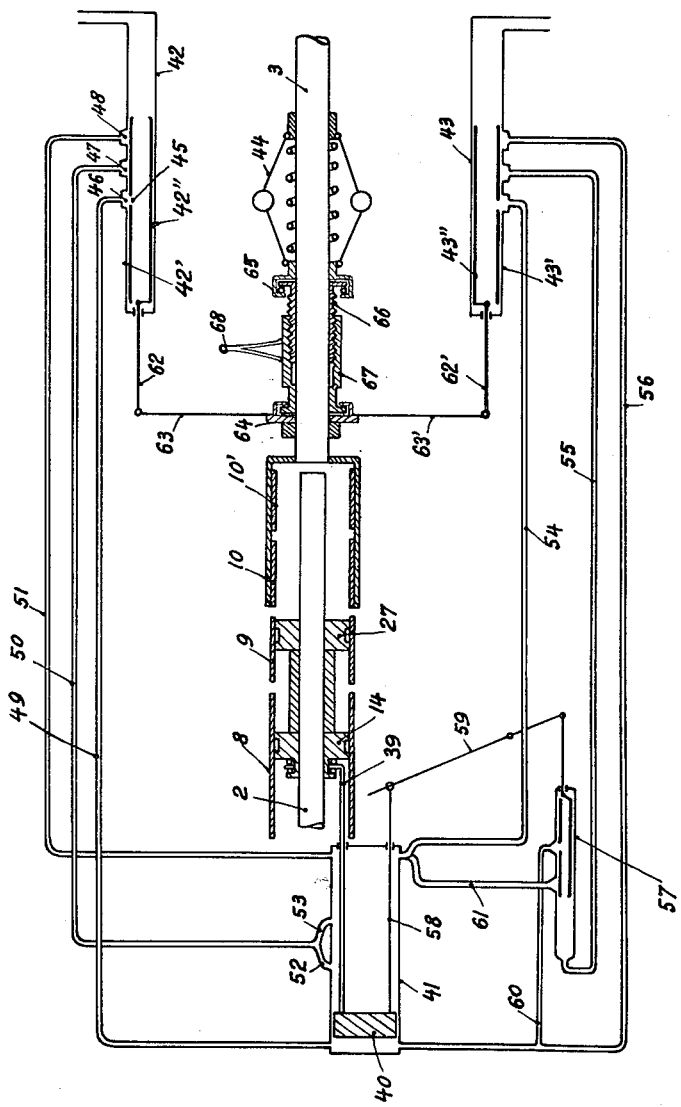
J. M. C. Semery
INVENTOR
By: Marks & Clerk
ATTYS.

Patented Sept. 3, 1935

2,013,586

UNITED STATES PATENT OFFICE 2,013,586

DEVICE FOR CHANGING GEAR

Jean Marie Charles Semery, Paris, France

Application July 3, 1934, Serial No. 733,685
In France July 13, 1933

9 Claims. (Cl. 74—336.5)

The present invention relates to a device for changing gear for motor cars and similar applications, of the type in which the passing from one gear to another does not necessitate a previous declutching. The invention aims particularly at a device of very simple realization permitting an easy and silent shift of gears whatever the speed of the vehicle may be, the necessary operation being effected automatically or being reduced to the mere displacement of a handle preferably disposed on the steering-wheel. This device is characterized by the fact that the pinions driven by the primary shaft and meshing with those of an intermediate shaft are mounted on sockets concentric with this shaft, identical to one another and turning freely in bearings disposed in the casing, these sockets being capable of being rendered integral in succession with the primary shaft by means of a suitable locking device, for instance a drum with eccentered slopes, fitted with balls or rollers, capable of gliding only along this shaft.

For the sake of example, there is described below and represented on the annexed drawings a form of realization of the device according to the invention; this device comprises three forward gears and a reverse, but it will, of course, be understood that the invention may be applied in the case of any desired number of gears.

Figure 1 is a longitudinal section through the gear box.

Figure 2 is a transverse section along the line A—A of Figure 1.

Figure 3 represents schematically one of the controlling members.

Figures 4 and 5 represent schematically respectively in longitudinal and in transverse section the gear-box provided with an improvement object of the invention.

Figure 6 represents a modification applicable to the case where the gear-box is disposed directly on the motor axis.

Figure 7 represents schematically the device of automatic control of the gear shift.

The device represented in Figure 1 comprises a casing 1 into which penetrate the primary or motor shaft 2 and the secondary shaft 3. The primary shaft 2 drives, by means of a device which will be described below, pinions of growing diameters 4, 5, 6 meshing with the corresponding pinions 4', 5', 6' keyed on the intermediate shaft 7 journaled in the casing 1.

The pinions 4, 5, 6, instead of being keyed on the shaft 2, are fixed on cylindrical sockets 8, 9, 10 concentric with the shaft 2 and capable of turning freely in bearings 11, 12, 13, preferably ball bearings carried by the casing 1. These sockets are identical to one another and the last socket 10 is integral with the secondary shaft 3.

On the driving axle 2 is mounted, by means of slidable key means, a locking device 14 arranged in a manner to render the said shaft integral with the socket in front of which it lies, as soon as the speed of the shaft is higher than that of the said socket. This device is realized for instance (Figure 2) in the form of a free-wheel arrangement, the drum 14 comprising, in a manner known per se, a circular groove constituted by eccentered slopes provided with balls or rollers. The drum 14 is provided inwardly with tenons 15 sliding in grooves 16 disposed on the driving axle 2, so that it is driven by this shaft whilst it may travel longitudinally on the latter. When the shaft 2 turns in the direction of the arrow, the balls are clamped against the inner wall of the corresponding socket, for instance the socket 9 in the case of the drawings, thus causing the driving of the secondary shaft through the means of the shaft 7 and of the last pinion 6 which is integral with the shaft 3 by means of its socket 10. However, as soon as the shaft 2 turns less rapidly than the socket opposite which is situated the drum 14, the balls are unclamped and the device acts as a free wheel. It is then possible to move, by means of a suitable device, the drum 14 along the grooved shaft 2 and to bring it opposite another socket; and acceleration of the motor producing a rising of the speed of the shaft 2, produces immediately the desired coupling of the shafts.

The sockets 8, 9, 10 correspond respectively to the first, second and third gear. A neutral and a reverse gear are also provided in the device. The latter comprises to this effect a fourth socket 17 which turns freely inside a concentrical socket 18 turning in a bearing 19 supported by the casing and carrying a pinion 20 (Figure 1). In this way, when the drum 14 is coupled to the socket 17, no movement is transmitted from the primary shaft 2 to the secondary shaft 3. For obtaining the reverse gear, the socket 17 may be rendered integral with the external socket 18 by means of any suitable device, for instance a dog clutch, the movement of the shaft 2 being then transmitted to the pinion 20 and from there, by means of suitable gear-wheels, to the intermediate shaft 7.

In the device shown on Figure 1, the socket 17 may glide in the socket 18 and these two sockets comprise circular flanges 17' and 18' provided with means, known per se, for rendering them integral with one another.

The bringing to neutral or into reverse gear may also be obtained by means of the device shown in Figure 4, in which the pinion 4 corresponding to the first gear is mounted freely on the socket 8, as well as the pinion 29 corresponding to the reverse gear, it being possible to render one or the other of these pinions integral with the socket 8 by means of a double dog clutch 30 slidably keyed on the socket 8 and controlled by the lever 31. On each of its faces, the clamping wheel 30 carries an internal toothing 32, 32' coming into mesh with the toothings 33, 33' cut into the lower faces of the pinions 4 and 29. When 32' is in mesh with 33', the reverse gear is obtained; when 32 is in mesh with 33, the device gives the first forward gear; the intermediate position (the position occupied by the dog clutch 30 in Figure 4) corresponds to neutral.

The displacement of the drum 14 along the shaft 2 is obtained by means of any suitable mechanical device constituted for instance (Figure 3) by one or more rods 21 parallel to the shaft 2 and carrying at their end a stop 22 situated inside a circular groove 25 disposed on the drum 14. The rod 21 carries a rack 23 meshing with a pinion whose axis is fixed, and which is actuated by a hand-lever preferably disposed on the steering-wheel and moving between marks corresponding to the various combinations of gears.

If it is desired to reduce to a minimum the angular displacement of the hand-lever, one may dispose between the latter and the pinion which it drives, a servo-device actuated for instance by the depression of the motor according to the process generally employed for the operation of servo-brakes and auto-clutches, a realization of such a device being described below.

For passing from one gear to another higher or lower one, it suffices to reduce the speed of the shaft 2 by letting go the accelerator pedal, to actuate the hand-lever for bringing into the position corresponding to the required gear, and then to accelerate again, without it being necessary to declutch. The operation cannot be missed and no noise will be produced, whatever the speed of the car may be. When starting, for passing from neutral into first gear or into reverse, it is necessary to declutch and to clutch in again at the end of the operation, as in the case of ordinary gear-boxes.

The device which has just been described still presents the drawback that it enables free-wheeling only. The object of the improvement shown on Figures 4 and 5 is to enable the braking of the car by slowing down the motor, this being particularly advantageous for riding down hills as it permits to avoid undue wear of the brakes. To this effect the device comprises a second free-wheel drum, the clamping members of which are disposed in a direction opposite to the first.

Referring to Figure 4, it will be seen that the first mentioned drum 14 is keyed on a muff 26 at the other end of which is keyed a second identical drum 27 the inclined slopes of which are, however, mounted in the opposite direction to that of the slopes of the drum 14 (Figure 5). The result of this arrangement is that when, for any reason, the motor shaft 2 rotates at a speed lower than that of the socket with which the drum 14 was rendered integral, the rollers of this drum will be freed whilst, on the contrary, as soon as the speed of the shaft 2 will become lower than that of the socket inside which rotates the drum 27, the locking will take place in the latter drum so that the secondary shaft will be braked by the primary shaft. In order to enable a correct working of this second free-wheeling device 27, springs 28 are disposed in a manner to counteract the inertia of the rollers and to apply the latter against the inner surface of the socket opposite which is situated the drum 27.

To enable the gear changes with this device, it is necessary that, on one hand, the two drums 14 and 27 shall never be situated inside the same socket 8, 9 or 10 and that, on the other hand, the passing from one socket to the next one shall not take place at the same time for both drums. To realize these conditions, the muff 26 is given such a length that the distance separating both drums is greater than the width of each of the sockets 8, 9 or 10.

After the socket 10 carrying the pinion 6 of direct drive, there is disposed a socket 10' freely mounted in the socket 10, and into which penetrates the drum 27 in the direct drive position.

From this description it will be seen that free-wheeling as such only takes place when in direct drive, for lower gears, on the contrary, it is possible to retard the vehicle by slowing down the speed of the motor.

In the case where the gear-box is to be mounted directly on the driving axle, as for instance for vehicles with front wheel drive or when the motor is placed at the back of the chassis, the device is modified according to Figure 6. In this modified form, the secondary shaft 3 is given the form of a socket disposed between the gear-box 1 and the fly-wheel 34 of the motor 35, the motor-shaft 2 passing through said socket. The secondary shaft 3 transmits in this case its movement to the driving axle 36 either as indicated on the drawings, by means of a worm device 37, 38, the wheel 38 being keyed to the axle, or by means of hypoid gears.

In Figure 7 there is shown schematically a device for the automatic change of gears, in which the displacement of the drums 14 and 27 provided with eccentered slopes, along the primary shaft 2 is controlled by a rod 39 integral with a piston 40 moving inside a cylinder 41, termed the selector cylinder and communicating, on one hand, with the suction pipe of the motor by means of a depression-valve 42 and, on the other hand, with the atmosphere by means of an air-inlet valve 43, these two valves being controlled by a centrifugal governor 44, for instance a ball-governor mounted on the secondary shaft 3.

This automatic control is arranged in the following manner:

The depression-valve 42 comprises as many positions as there are gear-combinations, for instance three in the example chosen and shown on the drawings. In each one of its positions, the valve 42 provides communication between the cylinder 41 and the suction of the motor, so as to create a depression in the part of this cylinder towards which it is required to move the piston 40. To this effect, the valve 42,—preferably constituted in the form of two cylindrical tubes 42', 42'', the first of which is fixed and the second capable of sliding inside the first in a manner that its lateral opening 45 may coincide with the openings 46, 47 and 48 of the external tube 42',—provides communication between the suction of the motor and three pipings 49, 50, 51 corresponding respectively to the first, second and third speed. The pipings 49 and 51 open in the selector cylinder 41 at the two ends of the latter, whilst the piping 50 opens in the middle of this cylinder by means of two branches 52, 53 disposed next to one another, at a sufficient distance apart for allowing the piston 40 to occupy a position between them without covering either of them.

The air-inlet valve 43 also comprises three positions and it is controlled by the governor 44 in synchronism with the depression-valve 42. This valve is similarly constituted by two concentric tubes 43', 43" and it provides communication, in its three positions, between the atmosphere and the pipings 54, 55 and 56, whilst the pipings 49, 50 and 51 are connected to the suction by the valve 42. The pipings 54 and 56, corresponding to the extreme positions of the air-inlet valve, i. e., to the first and third gear, open in the selector cylinder 41, at the two ends of the latter whilst the intermediate piping 55, corresponding to the second gear, leads to an auxiliary valve 57 which may be realized in the same manner as the two valves 42 and 43 and which is controlled by the displacement of the piston 40, by means of a rod 58 and of the articulated arm 59. This valve 57 has two positions thereby providing communication between the piping 55 and one or the other of the ends of the selector cylinder 41, by means of the pipings 60 and 61.

The centrifugal governor 44 controls the valves 42, 43 by means of articulated rods 62, 63 and 62', 63', the rods 63, 63' being coupled to a flange 64 capable of sliding on the secondary shaft 3 and connected, for instance by a ball thrust bearing 65, to said governor.

The operation of this device is as follows:

The drum 14 being at first opposite the socket 8 corresponding to the first speed, the driver couples the pinion 4 by actuating the lever 31 (Figure 3). At this moment, the valves 42 and 43 are in the position at which they open the pipings 49 and 54, corresponding to the first speed, so that a depression is produced on the left face of the piston 40 whilst air at atmospheric pressure penetrates to the right hand side of the piston which is thus held against the left end of the cylinder 41. When the vehicle starts to move and when, after a certain acceleration the shaft 3 attains the speed of rotation at which the engagement of the second gear is to take place, the governor 44 brings the valves 42, 43 into the position where they open the intermediate pipings 50 and 55, corresponding to the second speed, the piping 50 being thus connected to the suction pipe of the motor, a depression is produced on the right hand face of the piston 40 and, as the piping 55 has been simultaneously connected to the atmosphere by the valve 43, the air at atmospheric pressure is admitted to the left hand side of the piston 40, the auxiliary valve 57 providing communication between the piping 55 and the piping 60. The result of this is that as soon as the driver will have left the accelerator pedal free for awhile, the piston 40 is urged towards the right until it occupies the position between the two branches 52, 53 of the piping 50. At this moment the branches 52, 53 draw air from both faces of the piston, the latter thus being balanced, the admission of air through the piping 60 being cut off due to the new position of the valve 57. The position of the pipings 52 and 53 is chosen in such a manner that, when in this particular position, the piston 40 brings the drum 14 opposite the socket 9 corresponding to the second speed.

When, owing to a renewed acceleration, the shaft 3 has attained a sufficient speed for passing into the third gear, the governor 44 brings the valves 42, 43 into their last position, thus bringing the left face of the piston 40 into communication with the atmosphere through the piping 56, and the right face of this piston with the suction through the piping 51. As a result of this, the piston 40 moves towards the right hand bottom of the selector cylinder 41 and brings the drum 14 opposite the socket 10 corresponding to direct drive.

The various operations take place in the reverse order when, owing to the slowing down of the shaft 3, the governor brings about the shifting from third speed to second, and from second to first. During the shifting from third to second speed, however, the auxiliary valve 57 connects the right hand face of the piston with the atmosphere through the piping 61 thus allowing the movement of the piston 40 towards the left, this valve 57 being inoperative during the shift from second gear to first.

It is to be remarked that the values of the speed at which the successive shifts from one speed to the next are to take place, are not always the same: thus these speeds are higher on the road than in town, and higher still when driving up a hill. In order to adapt the automatic control which has just been described, to the conditions of the road, the invention also provides means for displacing, in one direction or in the other, the values of the speed at which the centrifugal governor brings about the passing from one gear to the next. To this effect, the thrust bearing 64, to which are coupled the articulated rods connected to the valves 42, 43, is rendered integral with the thrust bearing 65 of the governor by means of a member of adjustable length, for instance a socket 66 threaded externally, integral with the bearing 65 and a nut 67, integral with the bearing 64, the rotation of which is controlled by a lever 68 actuated by means of a hand-lever preferably arranged on the steering wheel and moving opposite a certain number of marks corresponding to the various speeds at which the shift of gears is to take place automatically. Thus, the driver may modify at will the operation of the centrifugal governor to adapt it to his way of driving.

An optical indicator may be disposed on the dashboard of the vehicle in order to indicate at any moment by a corresponding color the gear which is engaged.

Instead of being controlled automatically by the centrifugal governor, the depression servo-device may, of course, be controlled by a hand-lever operated by the driver; in this case it simply serves the purpose of providing the effort required for effecting the shift of gears.

What I claim is:—

1. Device for changing gear for motor vehicles and the like, comprising a casing, a driving shaft and a driven shaft, a series of pinions in said casing of increasing diameter with hollow bosses of same diameter, arranged one next to the other concentrically with the driving shaft so as to be able to turn freely in the casing, pinions of decreasing diameter keyed on the driven shaft and meshing with the first, a free-wheel drum provided with eccentered slopes and rollers, mounted by slidable keying means on the driving shaft and in contact with the internal surface of said pinions, these eccentered slopes being disposed in such a manner that the locking takes place as soon as the speed of the driving shaft is higher than that of the pinion with which the drum is in contact, a second free-wheel drum identical to the first but whose clamping members are mounted in the opposite direction to the first in a manner to provide locking when the driving shaft turns less rapidly than the pinion with which it is in contact, a muff, concentric with the driving shaft, on which are fixed the two free-wheel drums at a distance from one another, greater than the space between two pinions, means for controlling the longitudinal displacements of these two drums.

2. Device for changing gear for motor vehicles and the like, comprising a casing, a driving shaft and a driven shaft penetrating into this casing and situated in the produced direction of one another, an intermediate shaft parallel to the first and journalled in the casing, a series of pinions in said casing of increasing diameter with hollow bosses of same diameter, arranged one next to the other concentrically with the driving shaft so as to be able to turn freely in the casing, the last one of these pinions being integral with the driven shaft, pinions of decreasing diameter keyed on the intermediate shaft and meshing with the first, a free-wheel drum provided with eccentered slopes and rollers, mounted by slidable keying means on the driving shaft and in contact with the internal surface of said pinions, these eccentered slopes being disposed in such a manner that the locking takes place as soon as the speed of the driving shaft is higher than that of the pinion with which the drum is in contact, a muff integral with this drum, on this muff a second drum identical to the first and disposed in front of the latter at a distance greater than the space between two pinions, this second drum being provided with eccentered slopes disposed in a direction opposite to those of the first drum and with springs for applying the rollers against the inner surface of the pinions, beyond the pinion integral with the driven shaft a socket mounted freely in the casing, means for controlling the longitudinal displacements of these two drums.

3. Device for changing gear for motor vehicles and the like, comprising a casing, a driving shaft and a driven shaft, a series of pinions in said casing of increasing diameter with hollow bosses of same diameter, arranged one next to the other concentrically with the driving shaft so as to be able to turn freely in the casing, pinions of decreasing diameter keyed on the driven shaft and meshing with the first, a free-wheel drum provided with eccentered slopes and rollers, mounted by slidable keying means on the driving shaft and in contact with the internal surface of said pinions, these eccentered slopes being disposed in such a manner that the locking takes place as soon as the speed of the driving shaft is higher than that of the pinion with which the drum is in contact, a rod disposed in a parallel direction to the driving shaft, means for coupling this rod to the free-wheel drum, a servo-motor controlling the longitudinal displacements of this rod and means for controlling automatically said servo-motor by the speed of rotation of the driven shaft.

4. Device for changing gear for motor vehicles and the like, comprising a casing, a driving shaft and a driven shaft, a series of pinions in said casing of increasing diameter with hollow bosses of same diameter, arranged one next to the other concentrically with the driving shaft so as to be able to turn freely in the casing, pinions of decreasing diameter keyed on the driven shaft and meshing with the first, a free-wheel drum provided with eccentered slopes and rollers, mounted by slidable keying means on the driving shaft and in contact with the internal surface of said pinions, these eccentered slopes being disposed in such a manner that the locking takes place as soon as the speed of the driving shaft is higher than that of the pinion with which the drum is in contact, a cylinder, a piston movable in this cylinder, a rod integral with this piston and coupled to the free-wheel drum, a valve termed depression valve for putting this cylinder in communication with the suction of the motor, another valve termed air-inlet valve for putting said cylinder in communication with the atmosphere, a centrifugal governor mounted on the driven shaft, means for controlling these two valves by the centrifugal governor.

5. Device for changing gear for motor vehicles and the like, comprising a casing, a driving shaft and a driven shaft, a series of pinions in said casing of increasing diameter with hollow bosses of same diameter, arranged one next to the other concentrically with the driving shaft so as to be able to turn freely in the casing, pinions of decreasing diameter keyed on the driven shaft and meshing with the first, a free-wheel drum provided with eccentered slopes and rollers, mounted by slidable keying means on the driving shaft and in contact with the internal surface of said pinions. these eccentered slopes being disposed in such a manner that the locking takes place as soon as the speed of the driving shaft is higher than that of the pinion with which the drum is in contact, a cylinder, a piston movable in this cylinder, a rod integral with this piston and coupled to the free-wheel drum, a valve termed depression valve for putting this cylinder in communication with the suction of the motor, another valve termed air-inlet valve for putting said cylinder in communication with the atmosphere, these valves having as many positions as the device has gears, between each of these valves and the cylinder as many pipings as the valves have positions, a centrifugal governor mounted on the driven shaft, means for controlling these two valves by the centrifugal governor.

6. Device for changing gear for motor vehicles and the like, comprising a casing, a driving shaft and a driven shaft, a series of pinions in said casing of increasing diameter with hollow bosses of same diameter, arranged one next to the other concentrically with the driving shaft so as to be able to turn freely in the casing, pinions of decreasing diameter keyed on the driven shaft and meshing with the first, a free-wheel drum provided with eccentered slopes and rollers, mounted by slidable keying means on the driving shaft and in contact with the internal surface of said piston, these eccentered slopes being disposed in such a manner that the locking takes place as soon as the speed of the driving shaft is higher than that of the pinion with which the drum is in contact, a cylinder, a piston movable in this cylinder, a rod integral with this piston and coupled to the free-wheel drum, a valve termed depression valve for putting this cylinder in communication with the suction of the motor, another valve termed air-inlet valve for putting said cylinder in communication with the atmosphere, these valves having as many positions as the device has gears, between the depression valve and the cylinder of the pipings in a number equal to that of the positions of the valve, the pipings corresponding to the two extreme positions of the depression valve leading to the two opposite ends of the cylinder whilst the pipings corresponding to the intermediate positions of the valve lead to intermediate points on the cylinder, each by means of two neighbouring branches sufficiently separated from one another, however, for the piston being able to occupy a position between them without covering either of them; between the air-inlet valve and the cylinder as many pipings as this valve has positions, the pipings corresponding to the two extreme positions of this air-inlet valve leading to the opposite ends of this cylinder, an auxiliary valve with two positions, disposed on the piping corresponding to the intermediate positions of the air-inlet valve, means for controlling this valve by the displacements of the movable piston in the cylinder, two pipings corresponding to the two positions of this auxiliary valve and leading to the opposite ends of the cylinder, a centrifugal governor mounted on the driven shaft, means for controlling by this centrifugal governor the depression valve and the air-inlet valve.

7. Device for changing gear for motor vehicles and the like, comprising a casing, a driving shaft and a driven shaft, a series of pinions in said casing of increasing diameter with hollow bosses of same diameter, arranged one next to the other concentrically with the driving shaft so as to be able to turn freely in the casing, pinions of decreasing diameter keyed on the driven shaft and meshing with the first, a free-wheel drum provided the eccentered slopes and rollers, mounted by slidable keying means on the driving shaft and in contact with the internal surface of said pinions, these eccentered slopes being disposed in such a manner that the locking takes place as soon as the speed of the driving shaft is higher than that of the pinion with which the drum is in contact, a cylinder, a piston movable in this cylinder, a rod integral with this piston and coupled to the free-wheel drum, a valve termed depression valve for putting this cylinder in communication with the suction of the motor, another valve termed air-inlet valve for putting said cylinder in communication with the atmosphere, these valves having as many positions as the device has gears, and being constituted each by two cylindrical tubes opened at one end and disposed in a manner to slide one inside the other and connected by its open end respectively, the depression valve to the suction of the motor and the air-inlet valve to the atmosphere, on these external fixed tubes as many lateral orifices as the device has gears, pipings for connecting these lateral orifices to the cylinder, on the internal tubes a single lateral orifice disposed in a manner to be able to coincide with the openings of the outer tube, a governor mounted on the driven shaft, means for controlling by this governor the displacements of the inner tubes of the two valves.

8. Device for changing gear for motor vehicles and the like, comprising a casing, a driving shaft and a driven shaft, a series of pinions in said casing of increasing diameter with hollow bosses of same diameter, arranged one next to the other concentrically with the driving shaft so as to be able to turn freely in the casing, pinions of decreasing diameter keyed on the driven shaft and meshing with the first, a free-wheel drum provided with eccentered slopes and rollers, mounted by slidable keying means on the driving shaft and in contact with the internal surface of said pinions, these eccentered slopes being disposed in such a manner that the locking takes place as soon as the speed of the driving shaft is higher than that of the pinion with which the drum is in contact, a rod disposed in a parallel direction to the driving shaft, means for coupling this rod to the free-wheel drum, a servo-motor controlling the longitudinal displacements of this rod, a centrifugal governor mounted on the driven shaft, means for controlling automatically the servo-motor by this centrifugal governor, means for adjusting the action of the centrifugal governor upon the servo-motor in order to vary the values of the speeds of rotation of the driven shaft corresponding to the shifts from one gear to another.

9. Device for changing gear for motor vehicles and the like, comprising a casing, a driving shaft and a driven shaft, a series of pinions in said casing of increasing diameter with hollow bosses of same diameter, arranged one next to the other concentrically with the driving shaft so as to be able to turn freely in the casing, pinions of decreasing diameter keyed on the driven shaft and meshing with the first, a free-wheel drum provided with eccentered slopes and rollers, mounted by slidable keying means on the driving shaft and in contact with the internal surface of said pinions, these eccentered slopes being disposed in such a manner that the locking takes place as soon as the speed of the driving shaft is higher than that of the pinion with which the drum is in contact, a cylinder, a piston movable in this cylinder, a rod integral with this piston and coupled to the free-wheel drum, a valve termed depression valve for putting this cylinder in communication with the suction of the motor, another valve termed air-inlet valve for putting said cylinder in communication with the atmosphere, these valves having as many positions as the device has gears, and being constituted each by two cylindrical tubes opened at one end and disposed in a manner to slide one inside the other and connected by its open end respectively, the depression valve to the suction of the motor, and the air-inlet valve to the atmosphere, on these external fixed tubes as many lateral orifices as the device has gears, pipings for connecting these lateral orifices to the cylinder, on the internal tubes a single lateral orifice disposed in a manner to be able to coincide with the openings of the outer tube, a collar disposed in a manner to slide along the driven shaft, articulated rods between this collar and the inner movable tubes of the two valves, a centrifugal governor mounted on the driven shaft and having a thrust bearing movable along this shaft, link members of adjustable length between this bearing and the collar to which are connected the movable tubes of the two valves, these members comprising a threaded socket integral with the thrust bearing of the governor, a nut integral with the collar and engaging with said threaded socket, means for controlling the rotation of this nut.

JEAN MARIE CHARLES SEMERY.